United States Patent
Sherburne, Jr.

(10) Patent No.: US 7,398,414 B2
(45) Date of Patent: *Jul. 8, 2008

(54) CLOCKING SYSTEM INCLUDING A CLOCK CONTROLLER THAT USES BUFFER FEEDBACK TO VARY A CLOCK FREQUENCY

(75) Inventor: Robert Warren Sherburne, Jr., Kentfield, CA (US)

(73) Assignee: Gallitzin Allegheny LLC, Los Altos, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 11/240,999

(22) Filed: Sep. 29, 2005

(65) Prior Publication Data

US 2006/0080566 A1 Apr. 13, 2006

Related U.S. Application Data

(63) Continuation of application No. 09/814,355, filed on Mar. 21, 2001, now Pat. No. 6,990,598.

(51) Int. Cl.
*G06F 1/04* (2006.01)
*G06F 1/32* (2006.01)

(52) U.S. Cl. .................. 713/600; 713/322; 713/500

(58) Field of Classification Search .................. None
See application file for complete search history.

(56) References Cited

U.S. PATENT DOCUMENTS

| | | | | |
|---|---|---|---|---|
| 4,021,784 A | 5/1977 | Kimlinger | .................. | 713/401 |
| 5,117,442 A | 5/1992 | Hall | .................. | 375/356 |
| 5,381,157 A | 1/1995 | Shiga | .................. | 343/700 |
| 5,502,819 A | 3/1996 | Alrich et al. | .................. | 713/375 |
| 5,592,658 A | 1/1997 | Noam | .................. | 713/503 |
| 5,724,591 A | 3/1998 | Hara et al. | .................. | 713/322 |
| 5,734,878 A | 3/1998 | Hongo | .................. | 713/600 |
| 5,774,703 A | 6/1998 | Weiss et al. | .................. | 713/501 |
| 5,778,218 A | 7/1998 | Gulick | .................. | 713/503 |
| 5,790,817 A | 8/1998 | Asghar et al. | .................. | 710/311 |
| 5,790,877 A | 8/1998 | Nishiyama et al. | .................. | 713/323 |
| 5,799,005 A | 8/1998 | Soliman | .................. | 370/335 |
| 5,910,930 A | 6/1999 | Dieffenderfer et al. | .................. | 368/156 |
| 5,914,961 A | 6/1999 | Harris et al. | .................. | 370/503 |
| 5,925,133 A | 7/1999 | Buxton et al. | .................. | 713/323 |
| 5,960,331 A | 9/1999 | Weir et al. | .................. | 455/75 |
| 5,996,083 A | 11/1999 | Gupta et al. | .................. | 713/322 |
| 6,047,214 A | 4/2000 | Muller et al. | .................. | 607/61 |
| 6,047,248 A | 4/2000 | Georgiou et al. | .................. | 702/132 |

(Continued)

OTHER PUBLICATIONS

Intel, Migrating From Intel SA-100 to Intel 80200 Processor based on XScaleTM Microarchitecture. Application Note, Sep. 2000. http://www.intel.com/design/iio/applnots/273409 01.pdf.

(Continued)

*Primary Examiner*—Chun Cao

(57) ABSTRACT

A low power reconfigurable processor core includes one or more processing units, each unit having a clock input that controls the performance of the unit; one or more clock controllers having clock outputs coupled to the clock inputs of the processing units, the controller operating varying the clock frequency of each processing unit to optimize speed and processing power for a task; and a high-density memory array core coupled to the processing units.

19 Claims, 6 Drawing Sheets

U.S. PATENT DOCUMENTS

| | | | |
|---|---|---|---|
| 6,052,036 A | 4/2000 | Enstrom et al. | 331/176 |
| 6,088,807 A | 7/2000 | Maher et al. | 713/324 |
| 6,122,686 A | 9/2000 | Barthel et al. | 710/100 |
| 6,125,451 A | 9/2000 | Fukunaga | 713/500 |
| 6,141,762 A | 10/2000 | Nicol et al. | 713/300 |
| 6,188,381 B1 | 2/2001 | van der Wal et al. | 345/581 |
| 6,216,234 B1 | 4/2001 | Sager et al. | 713/501 |
| 6,236,278 B1 | 5/2001 | Olgarrd | 331/25 |
| 6,242,953 B1 | 6/2001 | Thomas | 327/115 |
| 6,300,881 B1 | 10/2001 | Yee et al. | 340/870.02 |
| 6,317,840 B1 | 11/2001 | Dean et al. | 713/320 |
| 6,415,152 B1 | 7/2002 | Chung | 455/446 |
| 6,542,754 B1 | 4/2003 | Sayers et al. | 455/502 |
| 6,560,712 B1 | 5/2003 | Arends et al. | 713/320 |
| 6,563,448 B1 | 5/2003 | Fontaine | 341/143 |
| 6,578,155 B1 | 6/2003 | Faucher et al. | 713/501 |
| 6,625,036 B1 | 9/2003 | Horio | 361/760 |
| 6,636,976 B1 | 10/2003 | Grochowski et al. | 713/300 |
| 6,647,502 B1 | 11/2003 | Ohmori | 713/322 |
| 6,711,691 B1 | 3/2004 | Howard et al. | 713/300 |
| 6,807,235 B2 | 10/2004 | Yano et al. | 375/259 |
| 6,829,017 B2 | 12/2004 | Phillips | 348/738 |
| 6,898,721 B2 | 5/2005 | Schmidt | 713/322 |
| 6,990,598 B2 * | 1/2006 | Sherburne, Jr. | 713/600 |
| 6,993,669 B2 | 1/2006 | Sherburne, Jr. | 713/322 |
| 7,139,921 B2 * | 11/2006 | Sherburne, Jr. | 713/322 |
| 2001/0014585 A1 | 8/2001 | Nakatsugawa | 455/11.1 |
| 2002/0147932 A1 | 10/2002 | Brock et al. | 713/300 |
| 2002/0175839 A1 | 11/2002 | Frey | 341/500 |
| 2002/0184546 A1 | 12/2002 | Sherburne, Jr. | 713/300 |
| 2003/0028844 A1 | 2/2003 | Coombs | 714/796 |
| 2004/0243866 A1 | 12/2004 | Sherburne, Jr. | 713/300 |
| 2005/0117633 A1 | 6/2005 | Schmidt | 375/219 |
| 2006/0059377 A1 | 3/2006 | Sherburne, Jr. | 713/300 |

OTHER PUBLICATIONS

Mekie, Joycee, Supratik Chakrabory and Dinesh K. Sharma, "Evaluation of Pausible Clocking for Interfacing High Speed IP Cores in GALS Framework," Paper; 2004, Proceedings of the 17th International Conference on VLSI Design, IEEE Computer Society.

Yun, Kenneth Y. and Ayoob E. Dooply, "Pausible Clocking-Based Heterogeneous Systems," Article, Sep. 14, 1997, IEEE Transactions on Very Large Scale Intergration (VLSI) Systems, vol. 7, No. 4, Dec. 1999, IEEE; p. 482-488.

Meincke, Thomas et.al., "Evaluating Benefits of Globally Asynchronous Locally Synchronous VLSI Architecture," Paper, Nov. 1998, 16th Norchip, pp. 50-57.

Teich, J. et al.; "Performance Analysis of Mixed Asynchronous Synchronous Systems," Paper, 1994, In Proceedings 1994 IEEE Workshop on VLSI Signal Processing.

* cited by examiner

CLOCKING SYSTEM INCLUDING A CLOCK CONTROLLER THAT USES BUFFER FEEDBACK TO VARY A CLOCK FREQUENCY

This application is a continuation of U.S. patent application Ser. No. 09/814,355, filed Mar. 21, 2001 now U.S. Pat. No. 6,990,598 entitled "Low Power Clocking Systems and Methods" by Robert Warren Sherburne, Jr.

The present invention relates to a low power electronic device.

Power management is an important requirement for battery powered or battery operated microprocessor based systems such as laptop computers, notebook computers, palmtop computers, personal data assistants (PDAs), hand-held communication devices, wireless telephones, and any other devices incorporating microprocessors in a battery-powered unit. While portability requires compact, highly integrated devices to decrease size and weight, portable devices can also be performance intensive. For example, to handle wireless signal processing, cell phones and wireless handheld devices require extensive calculation and processing. One way to achieve high performance is to apply parallelism in the processing of instructions. For example, multiple execution units can be operated in parallel under the control of a dispatcher to permit simultaneous processing of instructions. While the use of multiple parallel-operated execution units increases the performance of the computer, this results in increased power consumption.

Even though multiple parallel execution units increase the performance of the processor, power is wasted when some of the execution units are idle or performing no operations during various time intervals. For example, when transferring data from one data processor to another, each data processor having its own bus, delays in the transfer are unpredictable in that the bus for the responding data processor may not be immediately available to the requesting data processor. This problem is increased where the two processors run asynchronously, and is even worse where the processors run at different clock rates. The stalling of the requesting processor while waiting for the availability of the responding processor is further increased where large amounts of data are to be transferred. While the processors are stalled, power continues to be consumed even though work is not done.

To avoid stalling, buffers may be used and arranged as follows: a data processing unit which is fed data through a data buffering element (such as a first-in-first-out (FIFO)) and which outputs data to another data buffering element. Each element is typically synchronous to a common clock. Data rates may vary widely at each point in the system: feeding the first FIFO, acquisition by the processor, results out of the processor, and reads of the second FIFO. This leads to occurrence of system stalls to avoid overflowing a FIFO and also leads to intervals during which a FIFO or processor is empty or idle.

Designers have used other techniques for reducing power consumption of the processor. For example, as discussed in U.S. Pat. No. 6,088,807 to Maher, et al., the speed of the system clock is reduced to a fraction of the normal operating frequency during periods of inactivity. Since the power consumption of the processor is proportional to the frequency, reducing the frequency of the system clock also reduces the power consumption of the microprocessor. A second technique for reducing power turns off the system clock during periods of inactivity. Turning off the system clock affects all circuitry on the motherboard. Consequently, the circuitry that disables the system clock must also save all pertinent information in the microprocessor and associated board logic and restore the data upon resumption of activity such that the state of the computer after resumption of the system clock will be identical to the state of the computer prior to disabling the system clock. As a result, this technique for consuming power is both costly because of the complicated circuitry and slow because of the need to store and restore the state of the computer.

In one implementation of an architecture known as the Intel®™ Xscale for mobile processing applications, the Intel 80200 processor accepts an input clock frequency of 33 to 66 MHz and uses an internal PLL to lock to the input clock and multiplies the frequency by a variable multiplier to produce a high-speed core clock. This multiplier is initially configured by the PLL configuration pin and can be changed anytime later by software. Software has the ability to change the frequency of the clock without having to reset the core. Changing the clock frequency is similar to entering a low power mode. First, the core is stalled waiting for all processing to complete, second the new configuration is programmed, and then finally the core waits for the PLL to re-lock. This feature allows software to conserve power by matching the core frequency to the current workload.

To further reduce power consumption, the Intel 80200 processor core voltage level may also be reduced since power consumption is generally proportional to the square of the supply voltage level. The core can change frequency on a cycle-by-cycle basis, but switching the voltage would take several milliseconds. In addition, the core is designed with power-saving techniques that power up a functional block only when it's needed. This saves power by matching the core clock frequency to the current workload.

SUMMARY

A low power a reconfigurable processor core includes one or more processing units, each unit having a clock input that controls the performance of the unit; one or more clock controllers having clock outputs coupled to the clock inputs of the processing units, the controller operating varying the clock frequency of each processing unit to optimize speed and processing power for a task; and a high-density memory array core coupled to the processing units.

Implementations of the above aspect may include one or more of the following. The reconfigurable processor core can be one or more digital signal processors (DSPs) or reduced instruction set computer (RISC) processors. The processing unit can include a central processing unit (CPU) having a clock input coupled to the controller; and a buffer adapted to be read by the CPU, the buffer having a clock input coupled to the controller. The CPU and the buffer can be commonly clocked or can be separately clocked. A second buffer can be adapted to receive data from the CPU. The CPU, first and second buffers can be commonly clocked or separately clocked. The CPU can include a private instruction random access memory coupled to the CPU; and a private data random access memory coupled to the CPU.

In another aspect, a method is disclosed for clocking one or more processing elements, each element including a central processing unit (CPU) having a processor clock input, a first buffer adapted to be read by the CPU and a second buffer adapted to receive data from the CPU, each buffer having a clock input. The method includes varying the clock input to the processor and the first buffer based on the fill status of the first buffer; and varying the clock input to the processor and the second buffer based on the fill status of the second buffer.

In yet another aspect, a low power a reconfigurable processor core includes one or more processing units, each unit having a clock input that controls the performance of the unit, each unit coupled to a source buffer and a destination buffer; and means for varying the clock input to the processing unit, the first buffer and the second buffer based on the fill status of the buffers and high and low water marks.

Implementations can include the following. The water mark can be fixed or programmable. Further, the processing unit and the buffers can be individually or commonly clocked.

Implementations of the second aspect may include one or more of the following. The method can vary the clock input to the processor and the second buffer based on the fill status of the second buffer further comprises slowing down or stopping the clock if the second buffer is above its high water mark or if the second buffer is full. The clock input to the processor and the first buffer can be varied based on the fill status of the first buffer by slowing down or stopping the clock if the first buffer is below its low water mark or if the first buffer is empty. The clock input to the processor and the second buffer based on the fill status of the second buffer can increase the clock if the second buffer is below its low water mark or if the second buffer is empty. The method can increase the clock if the first buffer is above its low water mark or above its empty level. The processor, the first buffer and the second buffer can use a common clock.

Advantages of the invention may include one or more of the following. The system uses a combination of buffers and variable clocking techniques to reduce or balance power consumption. The system can reduce clock rate, or even stop the clock, for localized portions of the system. The system is power efficient and is ideal for battery-operated processor-based equipment, where it is desired to minimize battery size so that the equipment can be made small and lightweight. Since the system is not continuously clocked at the highest speed, power can be reduced when appropriate. The behavior is programmable according to the needs and allowances of the system, and may be dynamically controlled so as to account for different tasks or conditions. The local nature of the implementation allows each target application in a system to have its own programmable behavior.

As will be explained in detail below, since CMOS technology is used, power is only consumed when a functional unit is changing state (i.e., switching), aside from the leakage current loss inherent in these devices. Since each processing element or functional unit is clocked only as fast as necessary, the processing element or functional unit consumes negligible power and results in the power consumption reduction. Since power consumption is reduced, the heat dissipation requirements and associated packaging of the system is reduced. In addition, when a battery source is used, it can be made smaller for a given operational period of time. Furthermore, because power consumption is reduced, the line width of power supply buses can also be reduced.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIGS. 1-4 show exemplary embodiments to conserve power in a system with one or more processing elements or units 310, 320 and 330. Although these processing elements can operate in parallel, embodiments shown in FIGS. 2-4 place the processing units 310, 320 and 330 in serial so that each processing unit operates on the previous processing unit's outputs. Multiple instructions are executed at the same time in the different execution units 310, 320 and 330, as long as these instructions do not contend for the same resources (namely, shared memory). Additionally, the input to each processing unit 310, 320 or 330 is buffered, as is the output of each processing unit 310, 320 or 330. As discussed below, power can be saved by varying the clock frequency, the core voltage or a combination thereof, if necessary, to reduce heat or to reduce battery power consumption.

Figure 1:
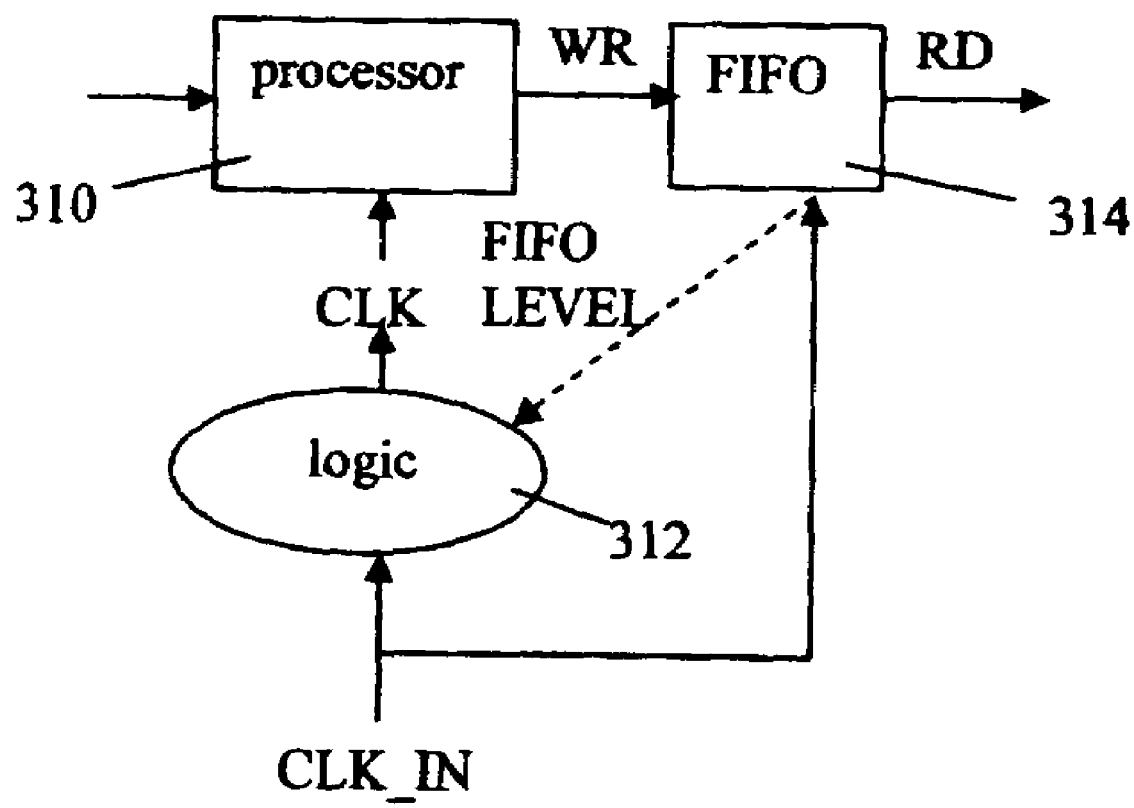
FIGS. 1-4 show exemplary embodiments to conserve power in a system with one or more processing elements or units.

Turning now to FIG. 1, a block diagram of one processing element 300 is illustrated. A processor 310 receives its clock from a controller 312. A master clock signal is provided to the controller 312 as well as a buffer 314. The buffer 314 can be a FIFO that accepts data generated by the processor 310. The data is gated by a write signal from the processor 310, and the FIFO provides a FIFO fill level feedback signal to the controller 312 such as FIFO_FULL, FIFO_EMPTY, or in between, for example. Based on the FIFO fill level feedback signal, the controller 312 can vary the clock signal to the processor 310 to increase or decrease the processing speed of the processor 310, thereby adjusting the fill rate to the FIFO.

When a FIFO nears full condition, the clock rate to its data source may be reduced so as to increase apparent ratio of POP events to PUSH events, and allow its available data capacity to increase over time. The reduction may be gradual or immediate; it also may be modulated by ensuing changes in available FIFO data capacity, in effect ratcheted in multiple steps as available capacity is reduced. The system may or may not include a stall function to avoid overflowing the FIFO. (Because the FIFO source may have multiple data words in transit, the system needs to be designed carefully in order to ensure that even at the reduced clock rate the FIFO will not overflow.) Alternatively, the clock could be stopped at the data source, providing a low power stall mechanism. Conversely, as available FIFO capacity is increased, the danger of overflow subsides and the clock rate may be increased. Hysteresis may be introduced in the rate control, and/or the rate increase may be immediate or gradual.

The processor can have separate instruction and data paths or can have common instruction/data paths. One exemplary processor 310 includes a register bank, a multiplier, a barrel shifter, an arithmetic logic unit (ALU) and a write data register. The exemplary processor can handle DSP functions by having a multiply-accumulate (MAC) unit in parallel with the ALU. Embodiments of the processor can rapidly execute multiply-accumulate (MAC) and add-compare-subtract (ACS) instructions in either scalar or vector mode. Other parts of the exemplary processor include an instruction pipeline, a multiplexer, one or more instruction decoders, and a read data register. A program counter (PC) register addresses the memory system 170. A program counter controller serves to increment the program counter value within the program counter register as each instruction is executed and a new instruction must be fetched for the instruction pipeline. Also, when a branch instruction is executed, the target address of the branch instruction is loaded into the program counter by the program counter controller. The processor incorporates data pathways between the various functional units. The lines of the data pathways may be synchronously used for writing information into the processor, or for reading information from the processor. Strobe lines can be used for this purpose.

In operation, instructions within the instruction pipeline are decoded by one or more of the instruction decoders to produce various core control signals that are passed to the different functional elements of the processor core 150. In response to these core control signals, the different portions of the processor core conduct processing operations, such as multiplication, addition, subtraction and logical operations. The register bank includes a current programming status register (CPSR) and a saved programming status register (SPSR). The current programming status register holds various condition and status flags for the processor. These flags may include processing mode flags (e.g. system mode, user mode, memory abort mode, etc.) as well as flags indicating the occurrence of zero results in arithmetic operations, carries and the like.

In one embodiment, the buffer 314 is a first-in, first-out memory circuit (hereinafter FIFO memory) using a dual port RAM, a write address counter (an address counter for writing data), a read address counter (an address counter for reading data), and a coincidence detect circuit. The dual port RAM has a data write terminal for receiving a data write signal, a write address terminal for receiving a write address signal, a data input port for inputting data, a data read terminal for receiving a data read signal, a read address terminal for receiving a read address signal, and a data output port for outputting data. The write address counter in turn has a clock input terminal which receives the data write signal. The write address counter outputs the write address signal to the write address terminal of the dual port RAM and an input terminal of the coincidence detect circuit.

The read address counter has a clock input terminal which receives the data read signal. The read address counter outputs the read address signal to the read address terminal of the dual port RAM and an input terminal of the coincidence detect circuit. The coincidence detect circuit has a clock input terminal which receives the data write signal and a clock input terminal which receives the data read signal. The coincidence detect circuit recognizes the state of the dual port RAM according to the data write signal, the data read signal, the write address signal and the read address signal and outputs a FULL signal or a EMPTY signal.

Figure 2:
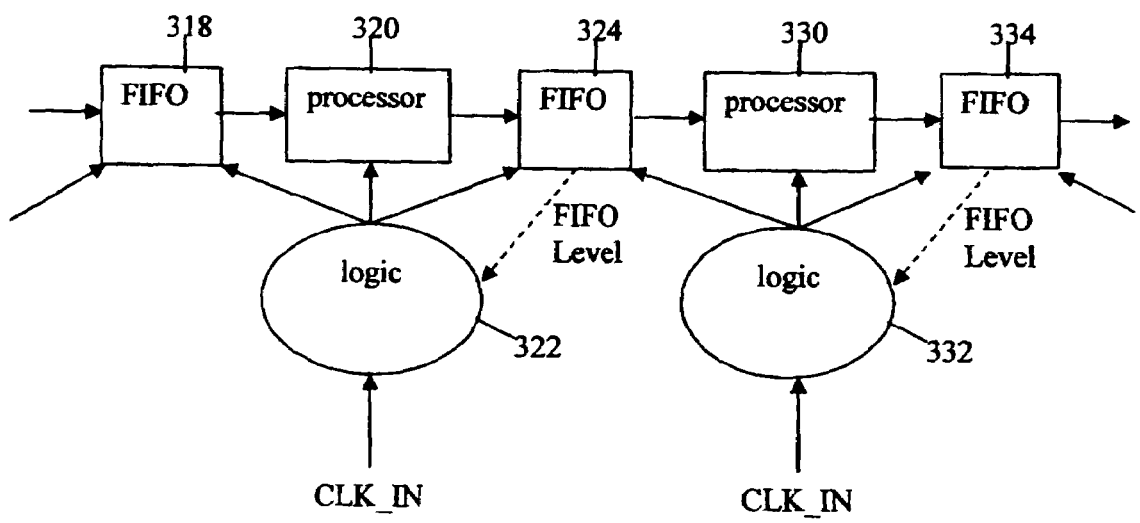

FIG. 2 shows a processor/buffer pair relying on a common source clock. In FIG. 2, a processor 320 receives its clock from a controller 322 and data from a buffer 318. A master clock signal is provided to the controller 322. A buffer 324 accepts data generated by the processor 320. The data is gated by a write signal from the controller 322, and the buffer 324 provides a buffer fill level feedback signal to the controller 322 such as BUFFER_FULL, BUFFER_EMPTY, or in between, for example. Based on the buffer fill level feedback signal, the controller 322 can vary the clock signal to the processor 320 and the buffers 318 and 324 to increase or decrease the processing speed of the processor 320, thereby adjusting the read rate from the buffer 318 and the fill rate to the buffer 324.

The output of the buffer 324 is provided to a processor 330, which receives its clock from a controller 332. A master clock signal is provided to the controller 332. A buffer 334 accepts data generated by the processor 330. The data is gated by a write signal from the controller 332, and the buffer 334 provides a buffer fill level feedback signal to the controller 332 such as BUFFER_FULL, BUFFER_EMPTY, or in between, for example. Based on the buffer fill level feedback signal, the controller 332 can vary the clock signal to the processor 330 to increase or decrease the processing speed of the processor 330, thereby adjusting the fill rate to the buffer.

Normally both processing elements 320 and 330 are run at the same clock rate. If the buffer 324 or 334 nears full, as defined by some "high water" mark, or if the buffer 324 or 334 is full, the clock rate to either processor 320 or 330 may be reduced to a fraction of its normal rate, or zero. Multiple high water marks may facilitate further, consecutive reduction of the clock rate. The actual behavior may be tailored to the system based on expected behavior, and may be dynamically modified for different tasks or by learning. Exemplary pseudo-code for the dynamically modified behavior of FIG. 2 is shown below.

```
if (reset or (dst_BUFFER < high water mark #1)) then
    clk <= clk_in;
else if (dst_BUFFER < high water mark #2) then
    clk <= clk_in/4;
else if (dst_BUFFER < high water mark #3) then
    clk <= clk_in/16;
.....
else
    clk <= off;
```

Figure 3:
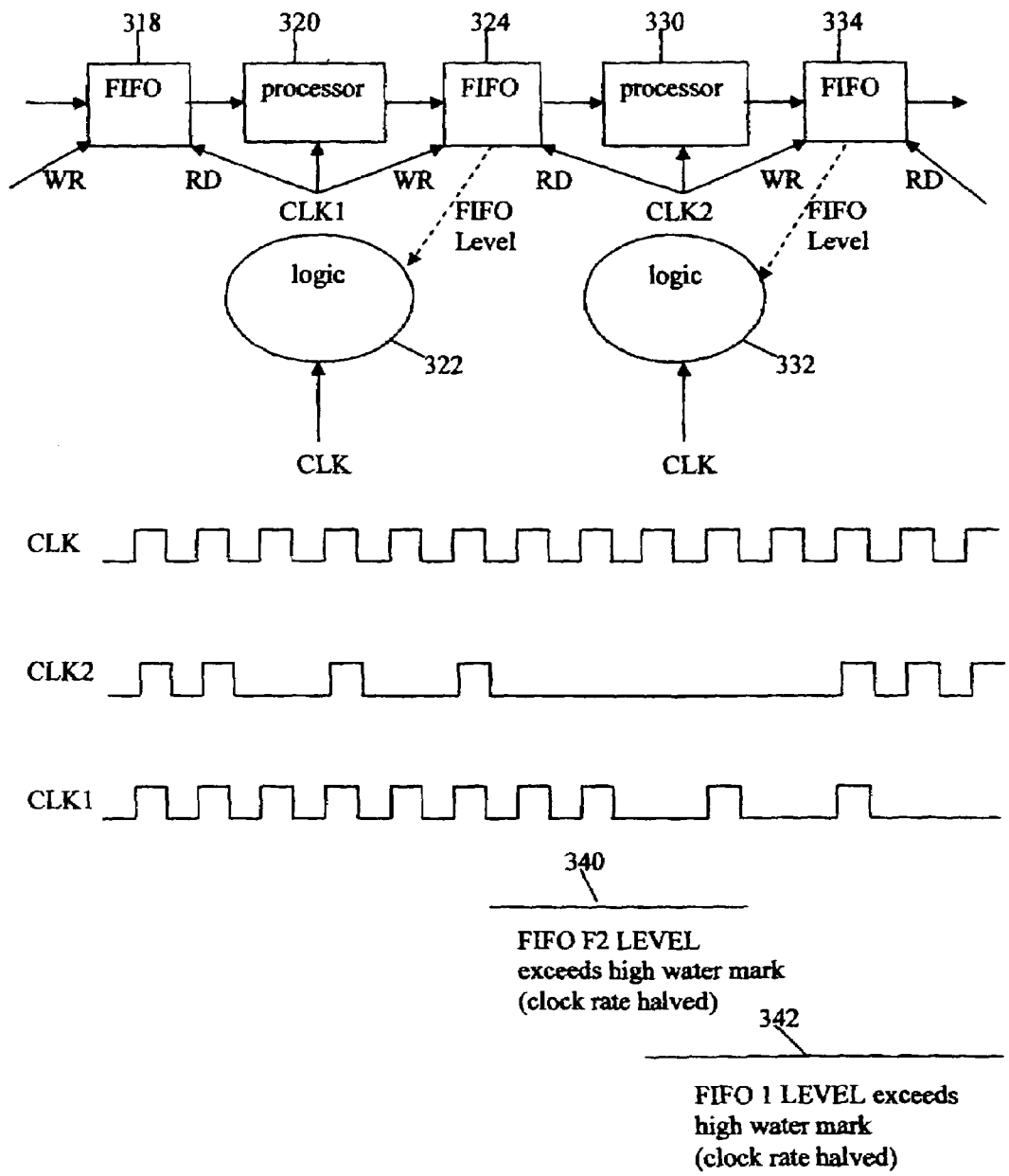

Turning now to FIG. 3, an example with multiple processors and multiple FIFO units and pseudocode is discussed next. Similar to FIG. 2, the processor 320 receives its clock from a controller 322 and data from a FIFO 318. A master clock signal is provided to the controller 322. A FIFO 324 accepts data generated by the processor 310. The data is gated by a write signal from the controller 322, and the FIFO provides a FIFO fill level feedback signal to the controller 322 such as FIFO_FULL, FIFO_EMPTY, or in between, for example. Based on the FIFO fill level feedback signal, the controller 322 can vary the clock signal to the processor 320 and the FIFOs 318 and 324 to increase or decrease the processing speed of the processor 320, thereby adjusting the read rate from the FIFO 318 and the fill rate to the FIFO 324.

The output of the FIFO 324 is provided to a processor 330, which receives its clock from a controller 332. A master clock signal is provided to the controller 332. A FIFO 334 accepts data generated by the processor 330. The data is gated by a write signal from the controller 332, and the FIFO provides a FIFO fill level feedback signal to the controller 332 such as FIFO_FULL, FIFO_EMPTY, or in between, for example. Based on the FIFO fill level feedback signal, the controller 332 can vary the clock signal to the processor 330 to increase or decrease the processing speed of the processor 330, thereby adjusting the fill rate to the FIFO.

During exemplary period 340, the FIFO 334 level is equal to or greater than its high water mark level. The controller 332 in turn reduces the clock rate CLK2. This action in turn causes events in the next exemplary period 342. In the period 342, the FIFO 324 eventually becomes equal to or greater than its high water mark level, and the controller 322 reduces the clock rate CLK1 to the processing element 320 and the FIFOs 318 and 324, respectively.

Each processor/FIFO pair may have its own, independent clock rate control. In this example the clock rate reduction is performed by gating the source clock; FIFO writes are shown clocked identically to the source processor, and FIFO reads are shown clocked identically to the destination processor. This keeps the write port synchronous with the data source, and the read port synchronous with the data sink, while allowing the FIFO clocks to be rate reduced for lower power.

Figure 4:
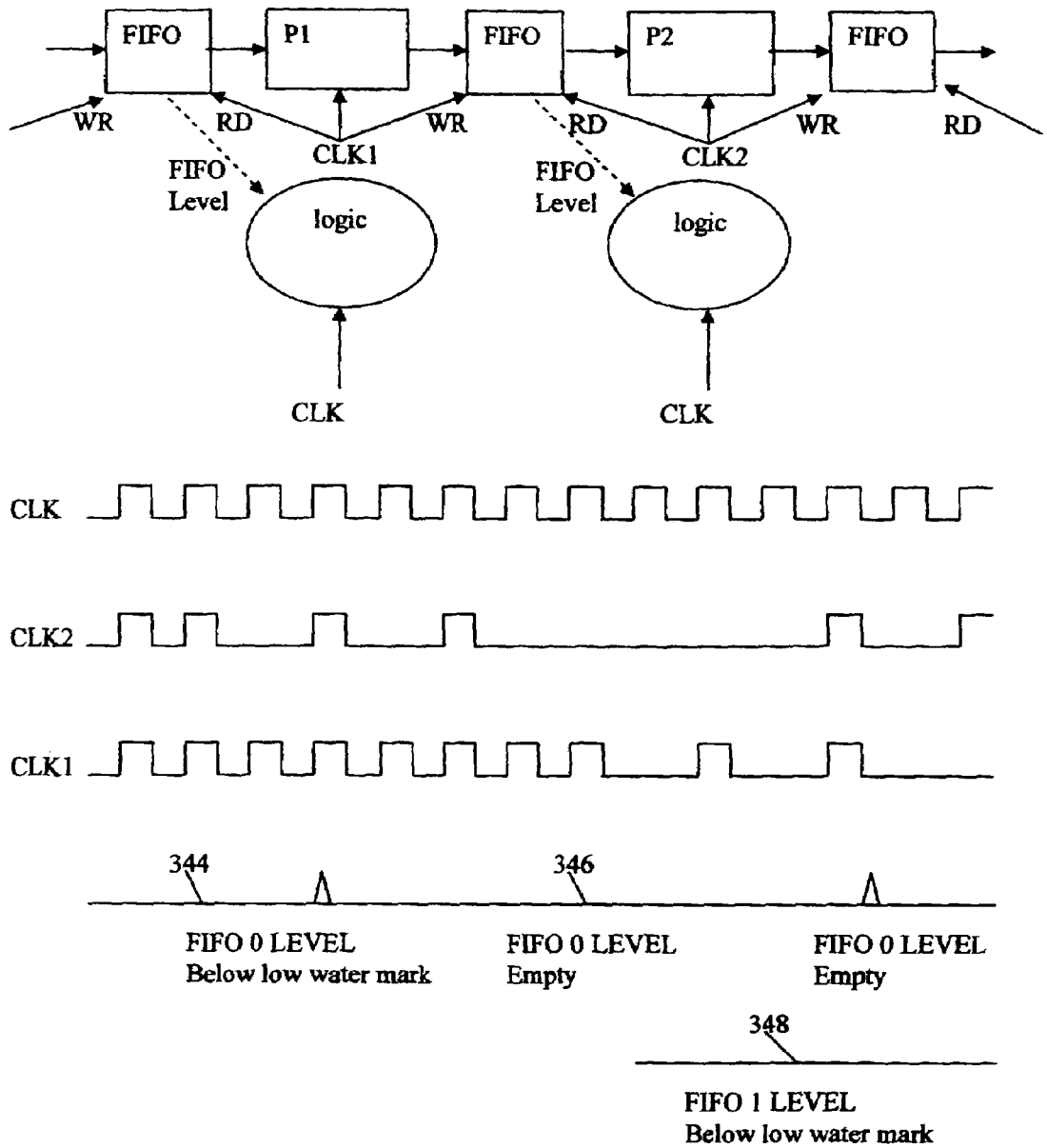

Another opportunity for conserving power occurs when the FIFOs approach their empty condition. During periods of FIFO empty condition, the units it feeds may have little or no computation to perform. Therefore a given system design may be amenable to reduced clock rate in presence of low or zero data input rate. Once the source FIFO is empty, assume the last data read will be subject to processing and later written out to the next FIFO after the processor. At this time, if the FIFO is still empty, the processor clock may be reduced to a low rate or zero in order to save power. FIG. 4 shows clock behavior in a scenario wherein one FIFO, then both FIFOs generate clock rate reductions as a result of reaching the low water mark or empty level. Later, as the FIFOs are replenished with data, the FIFOs then resume operation at their normal rate. Pseudo-code for the embodiment is shown below:

```
if (reset or (src_FIFO > low water mark #1)) then
    clk <= clk_in;
else if (src_FIFO > low water mark #2) then
    clk <= clk_in/4;
else if (src_FIFO > low water mark #3) then
    clk <= clk_in/16;
....
else
    clk <= off;
```

In CMOS embodiments, power is only consumed when a functional unit is changing state (i.e., switching). Since a processing unit or element is "off" when it is prevented from changing state, negligible power is consumed by that functional unit. This means that a functional unit that is off does not consume power, which results in the power consumption reduction. Since power consumption is reduced, the heat dissipation requirements and associated packaging of the system is reduced. In addition, when a battery source is used, it can be made smaller for a given operational period of time. Furthermore, because power consumption is reduced, the line width of power supply buses can also be reduced.

If the system tolerates variable rate of data processing, the clock may be slowed while the last read data (from the now empty FIFO) is propagating through the processor. Furthermore, low-water marks may be established so as to reduce the clock rate prior to empty condition; an immediate or gradual reduction may be invoked, with further reductions triggered by shallower low-water marks being attained. Reduced rate may include actual stoppage of the clock.

Some systems may not tolerate reduced throughput for the last read data out of the source FIFO. In that case various methods may be utilized to defer clock rate reduction or stoppage until after final data propagation. In one embodiment, a programmable down counter is clocked by the processor clock and decrements a predetermined number of cycles before indicating a suitable condition to reduce or stop the clock. The pseudo-code for this embodiment is as follows:

```
if (reset or (src_FIFO not empty)) then
    downcount <= value;
else if (!(downcount =0)) then
    downcount <= downcount minus one;
if (reset or (src_FIFO > low water mark #1)) then
    clk <= clk_in;
else if (src_FIFO > low water mark #2) then
    clk <= clk_in/4;
else if (src_FIFO > low water mark #3) then
    clk <= clk_in/16;
else if(!(downcount = 0)) then
    clk <= clk_in/32;
....
else
    clk <= off;
```

FIG. 4 shows an example of clock behavior including clock rate reduction during FIFO empty condition. In period 344, the FIFO 318 is below its low water mark and in period 346, the FIFO 318 is empty. Eventually, the processor 320 runs out of work and is shut down to reduce power consumption. Since the processor 330 is still running, eventually, the FIFO 324's low water mark level is reached, and the controller 332 reduces the clock rate for the clock CLK2.

Extension of the prior two cases to implementation concurrently capable of FIFO overflow and FIFO empty clock rate management for power saving is discussed next. The following is sample pseudo-code for each processor unit clock rate control, where the high water mark and full comparisons are for the write (destination) FIFO, and the low water mark and empty comparisons are for the read (source) FIFO, as applicable.

```
if (reset or (dst_FIFO < high water mark #1)) then
    if (src_FIFO > low water mark #1) then
        clk <= clk_in;
    else if (src_FIFO > low water mark #2) then
        clk <= clk_in/4;
    else if (src_FIFO > low water mark #3) then
        clk <= clk_in/16;
    ....
    else
        clk <= off;
else if (dst_FIFO < high water mark #2)) then
    clk <= clk_in/4;
else if (dst_FIFO < high water mark #3)) then
    clk <= clk_in/16;
....
else
    clk <= off;
```

If this system requires propagation of source FIFO data through the attached processor, before shutting off the clock, the downcount embodiment can be added to allow data to percolate through before the clock is turned off.

Figure 5:
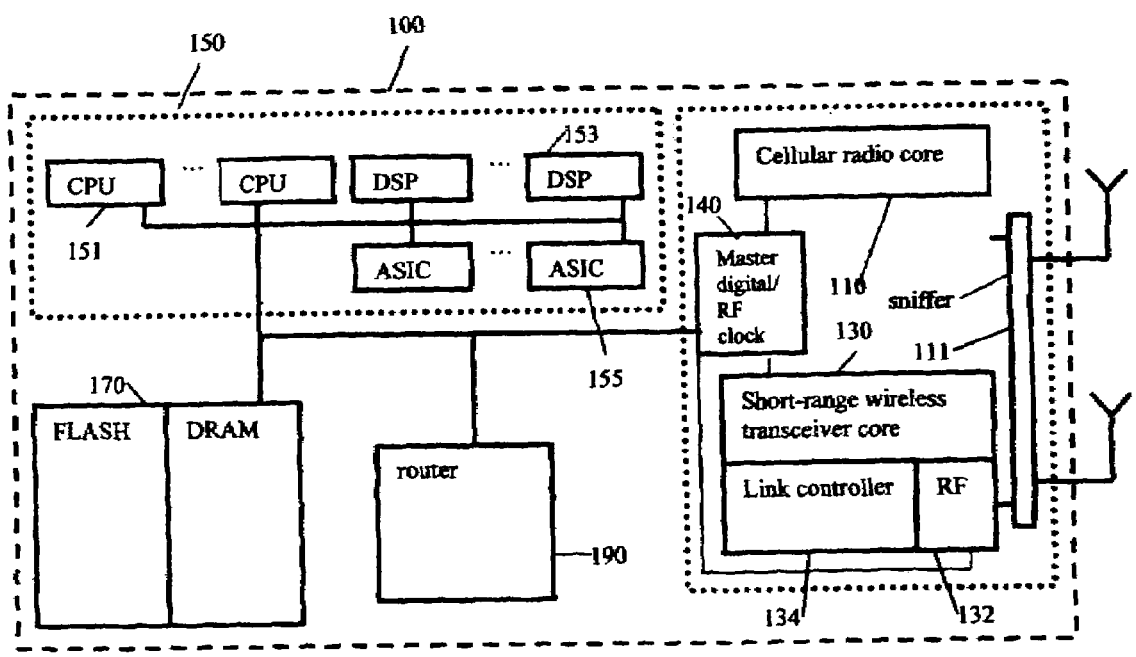
FIG. 5 is a block diagram of a single chip wireless communications integrated circuit.

FIG. 5 shows a block diagram of a multi-mode wireless communicator device 100 fabricated on a single silicon integrated chip. In one implementation, the device 100 is an integrated CMOS device with radio frequency (RF) circuits, including a cellular radio core 110, a short-range wireless transceiver core 130, and a sniffer 111, along side digital circuits, including a reconfigurable processor core 150, a high-density memory array core 170, and a router 190. The high-density memory array core 170 can include various memory technologies such as flash memory and dynamic random access memory (DRAM), among others, on different portions of the memory array core.

The reconfigurable processor core 150 can include one or more processors 151 such as MIPS processors and/or one or more digital signal processors (DSPs) 153, among others. The reconfigurable processor core 150 has a bank of efficient processors 151 and a bank of DSPs 153 with embedded functions. These processors 151 and 153 can be configured to operate optimally on specific problems and can include buffers on the receiving end and buffers on the transmitting end such the buffers shown in FIG. 1. For example, the bank of DSPs 153 can be optimized to handle discrete cosine transforms (DCTs) or Viterbi encodings, among others. Additionally, dedicated hardware 155 can be provided to handle specific algorithms in silicon more efficiently than the programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth™ connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver core 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core 110 provides wide area network (WAN) access, while the short-range wireless transceiver core 130 supports local area network (LAN) access. The reconfigurable processor core 150 has embedded read-only-memory (ROM) containing software such as IEEE802.11, GSM, GPRS, Edge, and/or Bluetooth™ protocol software, among others.

In one embodiment, the cellular radio core 110 includes a transmitter/receiver section that is connected to an off-chip antenna (not shown). The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of transmitter/receiver section 112, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port. During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I, I, Q, Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with integrated VCO and frequency synthesizer. The RF-unit 132 includes an RF receiver connected to an analog-digital converter (ADC), which in turn is connected to a modem 116 performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth™ specification and processes Bluetooth™ packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

In one exemplary operating sequence, a user is in his or her office and browses a web site on a portable computer through a wired local area network cable such as an Ethernet cable. Then the user walks to a nearby cubicle. As the user disconnects, the device 100 initiates a short-range connection using a Bluetooth™ connection. When the user drives from his or her office to an off-site meeting, the Bluetooth™ connection is replaced with cellular telephone connection. Thus, the device 100 enables easy synchronization and mobility during a cordless connection, and open up possibilities for establishing quick, temporary (ad-hoc) connections with colleagues, friends, or office networks. Appliances using the device 100 are easy to use since they can be set to automatically find and contact each other when within range.

When the multi-mode wireless communicator device 100 is in the cellular telephone connection mode, the short-range wireless transceiver core 130 is powered down to save power. Unused sections of the chip are also powered down to save power. Many other battery-power saving features are incorporated, and in particular, the cellular radio core 110 when in the standby mode can be powered down for most of the time and only wake up at predetermined instances to read messages transmitted by cellular telephone base stations in the radio's allocated paging time slot.

When the user arrives at the destination, according to one implementation, the cellular radio core 110 uses idle time between its waking periods to activate the short-range wireless transceiver core 130 to search for a Bluetooth™ channel signal. If Bluetooth™ signals are detected, the phone sends a deregistration message to the cellular system and/or a registration message to the Bluetooth™ system. Upon deregistration from the cellular system, the cellular radio core 110 is turned off or put into a deep sleep mode with periodic pinging and the short-range wireless transceiver core 130 and relevant parts of the synthesizer are powered up to listen to the Bluetooth™ channel.

According to one implementation, when the short-range wireless core 130 in the idle mode detects that Bluetooth™ signals have dropped in strength, the device 100 activates the cellular radio core 110 to establish a cellular link, using information from the latest periodic ping. If a cellular connection is established and Bluetooth™ signals are weak, the device 100 sends a deregistration message to the Bluetooth™ system and/or a registration message to the cellular system. Upon registration from the cellular system, the short-range transceiver core 130 is turned off or put into a deep sleep mode and the cellular radio core 110 and relevant parts of the synthesizer are powered up to listen to the cellular channel.

The router 190 can send packets in parallel through the separate pathways of cellular or Bluetooth™. For example, if a Bluetooth™ connection is established, the router 190 knows which address it is looking at and will be able to immediately route packets using another connection standard. In doing this operation, the router 190 pings its environment to decide on optimal transmission medium. If the signal reception is poor for both pathways, the router 190 can send some packets in parallel through both the primary and secondary communication channel (cellular and/or Bluetooth™) to make sure some of the packets arrive at their destinations. However, if the signal strength is adequate, the router 190 prefers the Bluetooth™ mode to minimize the number of subscribers using the capacity-limited and more expensive cellular system at any give time. Only a small percentage of the device 100, those that are temporarily outside the Bluetooth coverage, represents a potential load on the capacity of the cellular system, so that the number of mobile users can be many times greater than the capacity of the cellular system alone could support.

Figure 6:
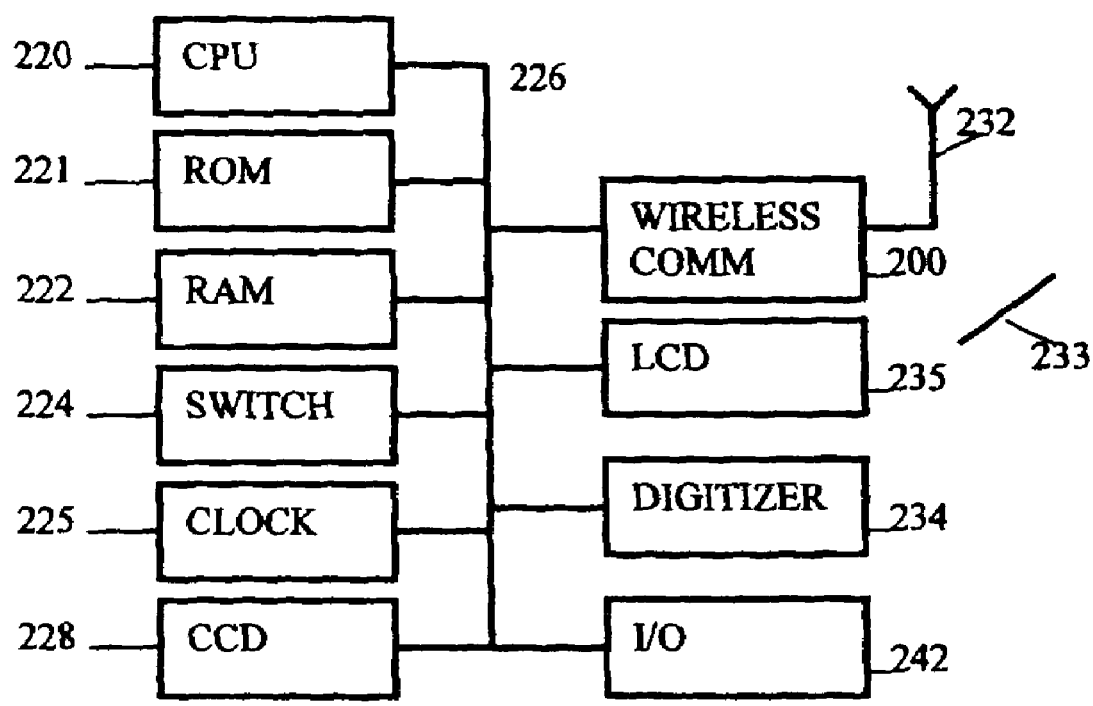
FIG. 6 is a block diagram of a portable computer system in accordance with the present invention.

FIG. 6 illustrates an exemplary computer system 200 with the wireless communication device 100. The computer system 200 is preferably housed in a small, rectangular portable enclosure. Referring now to FIG. 2, a general purpose architecture for entering information into the data management by writing or speaking to the computer system is illustrated. A processor 220 or central processing unit (CPU) provides the processing capability. The processor 220 can be a reduced instruction set computer (RISC) processor or a complex instruction set computer (CISC) processor. In one embodiment, the processor 220 is a low power CPU such as the MC68328V DragonBall device available from Motorola Inc.

The processor 220 is connected to a read-only-memory (ROM) 221 for receiving executable instructions as well as certain predefined data and variables. The processor 220 is also connected to a random access memory (RAM) 222 for storing various run-time variables and data arrays, among others. The RAM 222 is sufficient to store user application programs and data. In this instance, the RAM 222 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 221 for data back-up purposes.

The computer system 200 has built-in applications stored in the ROM 221 or downloadable to the RAM 222 which include, among others, an appointment book to keep track of meetings and to-do lists, a phone book to store phone numbers and other contact information, a notepad for simple word processing applications, a world time clock which shows time around the world and city locations on a map, a database for storing user specific data, a stopwatch with an alarm clock and a countdown timer, a calculator for basic computations and financial computations, and a spreadsheet for more complex data modeling and analysis. Additionally, project planning tools, and CAD/CAM systems, Internet browsers, among others, may be added to increase the functionality of portable computing appliances. Users benefit from this software, as the software allows users to be more productive when they travel as well as when they are in their offices.

The computer system 200 receives instructions from the user via one or more switches such as push-button switches in a keypad 224. The processor 220 is also connected to a real-time clock/timer 225 that tracks time. The clock/timer 225 can be a dedicated integrated circuit for tracking the real-time clock data, or alternatively, the clock/timer 225 can be a software clock where time is tracked based on the clock signal clocking the processor 220. In the event that the clock/timer 225 is software-based, it is preferred that the software clock/timer be interrupt driven to minimize the CPU loading. However, even an interrupt-driven software clock/timer 225 requires certain CPU overhead in tracking time. Thus, the real-time clock/timer integrated circuit 225 is preferable where high processing performance is needed.

The processor 220 drives an internal bus 226. Through the bus 226, the computer system can access data from the ROM 221 or RAM 222, or can acquire I/O information such as visual information via a charged coupled device (CCD) 228. The CCD unit 228 is further connected to a lens assembly (not shown) for receiving and focusing light beams to the CCD for digitization. Images scanned via the CCD unit 228 can be compressed and transmitted via a suitable network such as the Internet, through Bluetooth channel, cellular telephone channels or via facsimile to a remote site.

Additionally, the processor 220 is connected to the multi-mode wireless communicator device 100, which is connected to an antenna 232. The device 100 satisfies the need to access electronic mail, paging, mode/facsimile, remote access to home computers and the Internet. The antenna 232 can be a loop antenna using flat-strip conductors such as printed circuit board wiring traces as flat strip conductors have lower skin effect loss in the rectangular conductor than that of antennas with round-wire conductors. One simple form of wireless communication device 100 is a wireless link to a cellular telephone where the user simply accesses a cellular channel similar to the making of a regular voice call. Also mention that one channel is reserved for making voice calls. Typically, data channels are not usable for voice communications because of the latency and low packet reliability, so a dedicated voice channel is necessary. In one implementation, GPRS, there are a total of 8 channels per user, one of which is dedicated to voice when the user decides to make a voice call. This voice connection is independent of the data connection.

The processor 220 of the preferred embodiment accepts handwritings as an input medium from the user. A digitizer 234, a pen 233, and a display LCD panel 235 are provided to capture the handwriting. Preferably, the digitizer 234 has a character input region and a numeral input region that are adapted to capture the user's handwritings on words and numbers, respectively. The LCD panel 235 has a viewing screen exposed along one of the planar sides of the enclosure are provided. The assembly combination of the digitizer 234, the pen 233 and the LCD panel 235 serves as an input/output device. When operating as an output device, the screen 235 displays computer-generated images developed by the CPU 220. The LCD panel 235 also provides visual feedback to the user when one or more application software execute. When operating as an input device, the digitizer 234 senses the position of the tip of the stylus or pen 233 on the viewing screen 235 and provides this information to the computer's processor 220. In addition to the vector information, it is contemplated that display assemblies capable of sensing the pressure of the stylus on the screen can be used to provide further information to the CPU 220.

The CPU 220 accepts pen strokes from the user using the stylus or pen 233 that is positioned over the digitizer 234. As the user "writes," the position of the pen 233 is sensed by the digitizer 234 via an electromagnetic field as the user writes information to the computer system. The digitizer 234 converts the position information to graphic data. For example, graphical images can be input into the pen-based computer by merely moving the stylus over the surface of the screen. As the CPU 220 senses the position and movement of the stylus, it generates a corresponding image on the screen to create the, illusion that the pen or stylus is drawing the image directly upon the screen. The data on the position and movement of the stylus is also provided to handwriting recognition software, which is stored in the ROM 221 and/or the RAM 222. The handwriting recognizer suitably converts the written instructions from the user into text data suitable for saving time and expense information. The process of converting the pen strokes into equivalent characters and/or drawing vectors using the handwriting recognizer is described below.

The computer system is also connected to one or more input/output (I/O) ports 242 which allow the CPU 220 to communicate with other computers. Each of the I/O ports 242 may be a parallel port, a serial port, a universal serial bus (USB) port, a Firewire port, or alternatively a proprietary port to enable the computer system to dock with the host computer. In the event that the I/O port 242 is housed in a docking port, after docking, the I/O ports 242 and software located on a host computer (not shown) support an automatic synchronization of data between the computer system and the host computer. During operation, the synchronization software runs in the background mode on the host computer and listens for a synchronization request or command from the computer system 200. Changes made on the computer system and the host computer will be reflected on both systems after synchronization. Preferably, the synchronization software only synchronizes the portions of the files that have been modified to reduce the updating times. The I/O port 242 is preferably a high speed serial port such as an RS-232 port, a Universal Serial Bus, or a Fibre Channel for cost reasons, but can also be a parallel port for higher data transfer rate.

One or more portable computers 200 can be dispersed in nearby cell regions and communicate with a cellular mobile support station (MSS) as well as a Bluetooth station. The cellular and Bluetooth stations relay the messages via stations positioned on a global basis to ensure that the user is connected to the network, regardless of his or her reference to home. The stations are eventually connected to the Internet, which is a super-network, or a network of networks, interconnecting a number of computers together using predefined protocols to tell the computers how to locate and exchange data with one another. The primary elements of the Internet are host computers that are linked by a backbone telecommunications network and communicate using one or more protocols. The most fundamental of Internet protocols is called Transmission Control Protocol/Internet Protocol (TCP/IP), which is essentially an envelope where data resides. The TCP protocol tells computers what is in the packet, and the IP protocol tells computers where to send the packet. The IP transmits blocks of data called datagrams from sources to destinations throughout the Internet. As packets of information travel across the Internet, routers throughout the network check the addresses of data packages and determine the best route to send them to their destinations. Furthermore, packets of information are detoured around non-operative computers if necessary until the information finds its way to the proper destination.

The Web is based on a client/server model where Web pages reside on host computers that "serve up" pages when the user's computer (client computer) requests them. As the user "surfs" the Web, a browser can request data from the database on a server computer that processes and replies the desired data back to the computer system of FIG. 2 and to display that request when the request is fulfilled by the server. The client computer runs a browser software which asks for specific information by sending a HTTP request across the Internet 150 connection to the host computer. When the host computer receives the HTTP request, it responds by sending the data back to the client.

The browser commonly features a graphical user interface with icons and menus across the top along with a field to supply the URL for retrieval purposes. Navigational buttons guide the users through cyberspace in a linear manner, either one page forward or backward at a time. Pull down menus provide a history of sites accessed so that the user can revisit previous pages. A stop button is typically provided to cancel the loading of a page. To preserve favorite sites, a bookmark is provided to hold the user's favorite URLs in a list such as a directory tree. Furthermore, the browser typically provides a temporary cache on the data storage device or in RAM. The cache allows a more efficient Internet access as it saves bandwidth and improves access performance significantly. The browser also interprets HyperText Markup Language (HTML) which allows web site creators to specify a display format accessible by HTML compatible browsers.

Typically, when the user types in the URL or clicks on a hyperlink, TCP/IP opens a connection between the host and client computers. The browser then generates a request header to ask for a specific HTML document. The server responds by sending the HTML document as text to the client via the TCP/IP pipeline. The client computer acknowledges receipt of the page and the connection is closed. The HTML document is stored in the browser's cache. The browser then parses the HTML document for text and tags. If the browser runs across tags that link to images/pictures and sounds, the browser makes separate requests for these files to the server and displays or generates sounds to the user.

To supply more intelligent processing of information over the Internet, a language such as Java may be utilized. Java was developed originally by Sun Microsystems of Mountain View, Calif. The specification for the Java language is stored at the Java web site http://java.sun.com/. The web site contains the Java development software, a HotJava web browser, and on-line documentation for all aspects of the Java language, hereby incorporated by reference. Designed to be small, simple and portable across processor platforms and operating systems, Java can download and play applets on a browser system of the receiver, or reader. Applets are Java programs that are downloaded over the Internet World Wide Web, as dictated by a tag such as <applet> tags and executed by a Web browser on the reader's machine. In Java, the compiler takes the instructions and generates bytecodes, which are system independent machine codes. A bytecode interpreter executes the bytecodes. The bytecode interpreter can execute stand-alone, or in the case of applets, the bytecode interpreter is built-in Java compatible browsers. Thus, with a Java compatible client-server, the Internet is transformed from a passive giant book of information into an active network capable of supporting electronic commerce and virtual ecosystems. The computer 200 allows users to move about freely within and between cells while transparently maintaining all connections, particularly with the Internet.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, the notions of "FIFO" and "processor" can be expanded to include other types of functional blocks and units. Fan-in and fan-out of unity was shown in the functional block diagrams. The system may be applied to systems not limited to this constraint. Further, although the clock rate management has been applied to processor/FIFO pairs; the clock management need not necessarily be applied to both units. The FIFOs have been shown as having gated clocks generated independently for read and write ports, which is an optimization which reduces FIFO clock power dissipation. Alternatively the FIFO may receive the logical "OR" of the source and sink unit clocks (in a synchronous system). Additional data may be used to affect the clock rate control. For instance, the user or the program may set maximum or minimum rates as a function of each task or other condition, uniformly or individually to each rate controller.

Clock rate control may be performed in conjunction with source power status or mode: e.g. low battery, or battery versus line supply, or other supply management. Examples were based on clock gating for rate management; alternative techniques for modifying clock rate are applicable, including but not limited to division and oscillator modulation. Further, only synchronous designs were illustrated; the system can also use asynchronous, isosynchronous, and combinations thereof. The clock rate control may be affected by system reset so as to initialize the rate or initiate a sequence of events affecting the clock rate behavior. Additionally, a down counter was introduced to illustrate a method to account for data flow latency before slowing or stopping the clock in the FIFO empty case. System requirements may allow rate reduction before final data propagation through the processor, but may necessitate delaying clock stoppage until it occurs. Various configurations are possible; and the countdown clock need not be limited to the processor clock. Multiple, independent clock rate control units in the system may be truly independent of each other, or may be interconnected so as to provide a controllable relative phase relationship between each other. Such a phase relationship may be fixed, dynamic, or programmable.

The following claims are intended to encompass all such modifications.

What is claimed is:

1. An integrated circuit comprising:
   a first processor unit of the integrated circuit capable of receiving a first clock to control the first processor unit;
   a first buffer capable of receiving data from an output of the first processor unit, the first buffer configured to provide a feedback signal to a first clock controller;
   a second processor unit of the integrated circuit capable of receiving the data from the first buffer and configured to receive a second clock to control the second processor unit; and
   the first clock controller capable of controlling the first clock based on the feedback signal.

2. The integrated circuit of claim 1, further comprising a memory of the integrated circuit coupled to the first processor unit and the second processor unit.

3. The integrated circuit of claim 1, further comprising a wireless transceiver coupled to the first processor unit and the second processor unit.

4. The integrated circuit of claim 1, further comprising a reconfigurable processor core including the first processor unit and the second processor unit.

5. The integrated circuit of claim 1, wherein the first clock controller is configured to vary the first clock based on the feedback signal.

6. The integrated circuit of claim 1, further comprising a second clock controller configured to control the second clock.

7. The integrated circuit of claim 1, wherein the first clock controller is configured to provide a write signal to the first buffer and is configured to provide a read signal to an input buffer coupled to an input of the first processor unit.

8. The integrated circuit of claim 1, wherein the first clock controller is configured to lower the first clock by a first amount if the feedback signal is greater than a first threshold.

9. The integrated circuit of claim 8, wherein the first clock controller is configured to lower the first clock by a second amount if the feedback signal is greater than a second threshold, wherein the second amount and the second threshold are greater than the first amount and the first threshold, respectively.

10. A system comprising:
    an integrated circuit including a digital portion and an analog portion, the digital portion having:
    a reconfigurable processor core including:
      a first processor capable of receiving a first clock to control the first processor;
      a first buffer capable of receiving data from an output of the first processor, the first buffer configured to provide a feedback signal to a first clock controller;
      a second processor capable of receiving the data from the first buffer and configured to receive a second clock to control the second processor; and
      the first clock controller capable of controlling the first clock based on the feedback signal; and
    the analog portion having radio frequency (RF) circuitry capable of communicating baseband data from the reconfigurable processor core.

11. The system of claim 10, further comprising a second buffer coupled to an input of the first processor, the second buffer capable of being controlled by the first clock.

12. The system of claim 10, wherein the first clock controller is configured to provide a write signal to the first buffer based on the feedback signal, wherein the write signal corresponds to the first clock.

13. The system of claim 10, wherein the first clock controller is configured to lower a frequency of the first clock if the feedback signal is above a threshold.

14. The system of claim 13, wherein the threshold is adjustable.

15. A method comprising:
- clocking a first processor of an integrated circuit with a first clock;
- clocking a second processor of the integrated circuit with a second clock, the second clock different than the first clock;
- clocking a buffer coupled to provide data from the first processor to the second processor with the first clock;
- using at least one clock controller to generate a frequency of the first clock and the second clock from a third clock to control the first processor and the second processor; and
- varying the first clock based on a feedback signal from the buffer.

16. The method of claim 15, further comprising generating a fourth clock from the third clock to control a wireless transceiver core on the integrated circuit using the at least one clock controller.

17. The method of claim 15, further comprising maintaining the third clock at a fixed frequency.

18. The method of claim 15, further comprising varying the second clock based on a feed forward signal from the buffer.

19. The method of claim 15, further comprising generating the feedback signal based on a comparison between a level of the buffer and a threshold.

* * * * *